C. L. GRAHAM
WIRE STRETCHER.
APPLICATION FILED SEPT. 16, 1913.
1,113,002.
Patented Oct. 6, 1914.
2 SHEETS—SHEET 2.
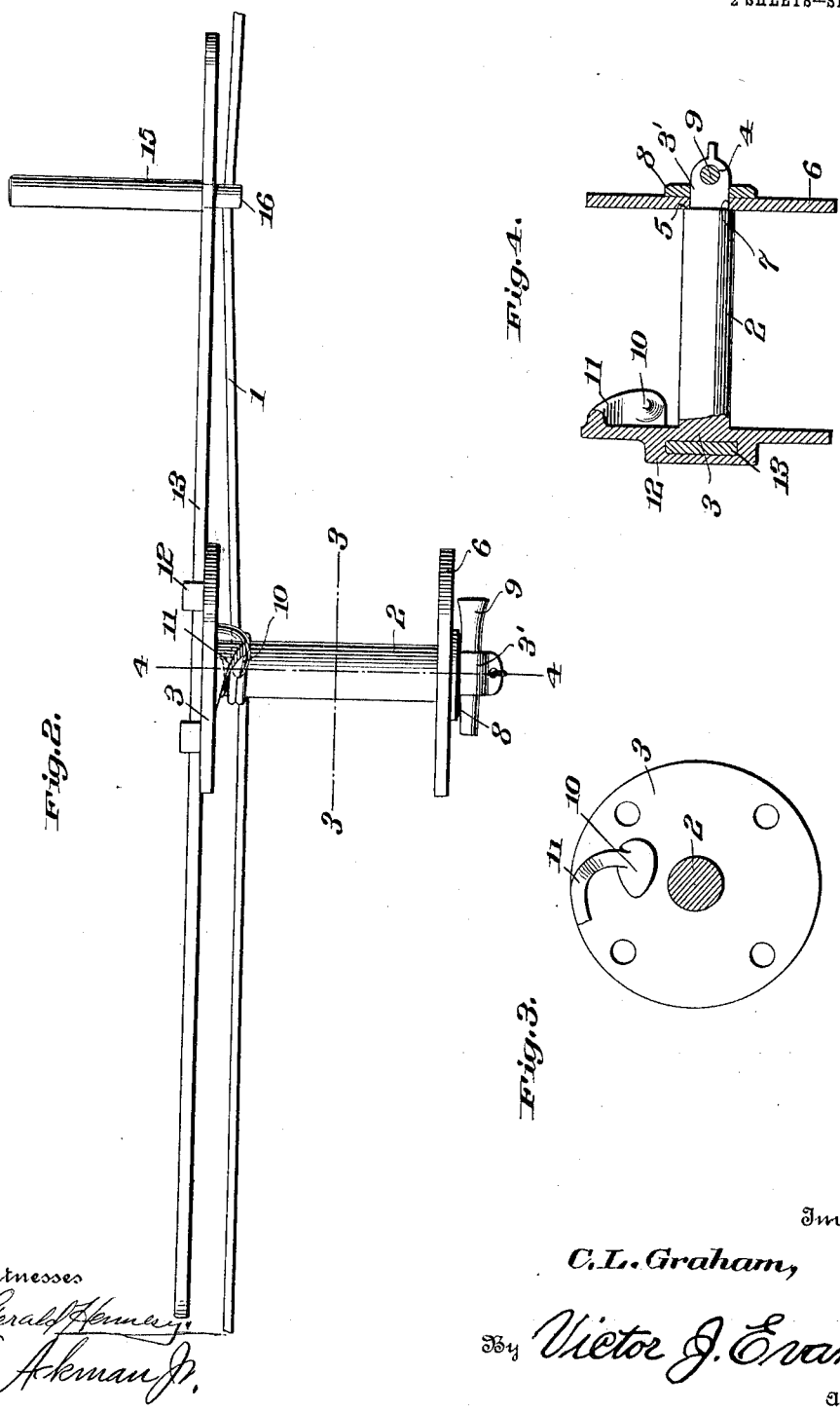
Inventor
C. L. Graham,
By Victor J. Evans
Attorney
Witnesses

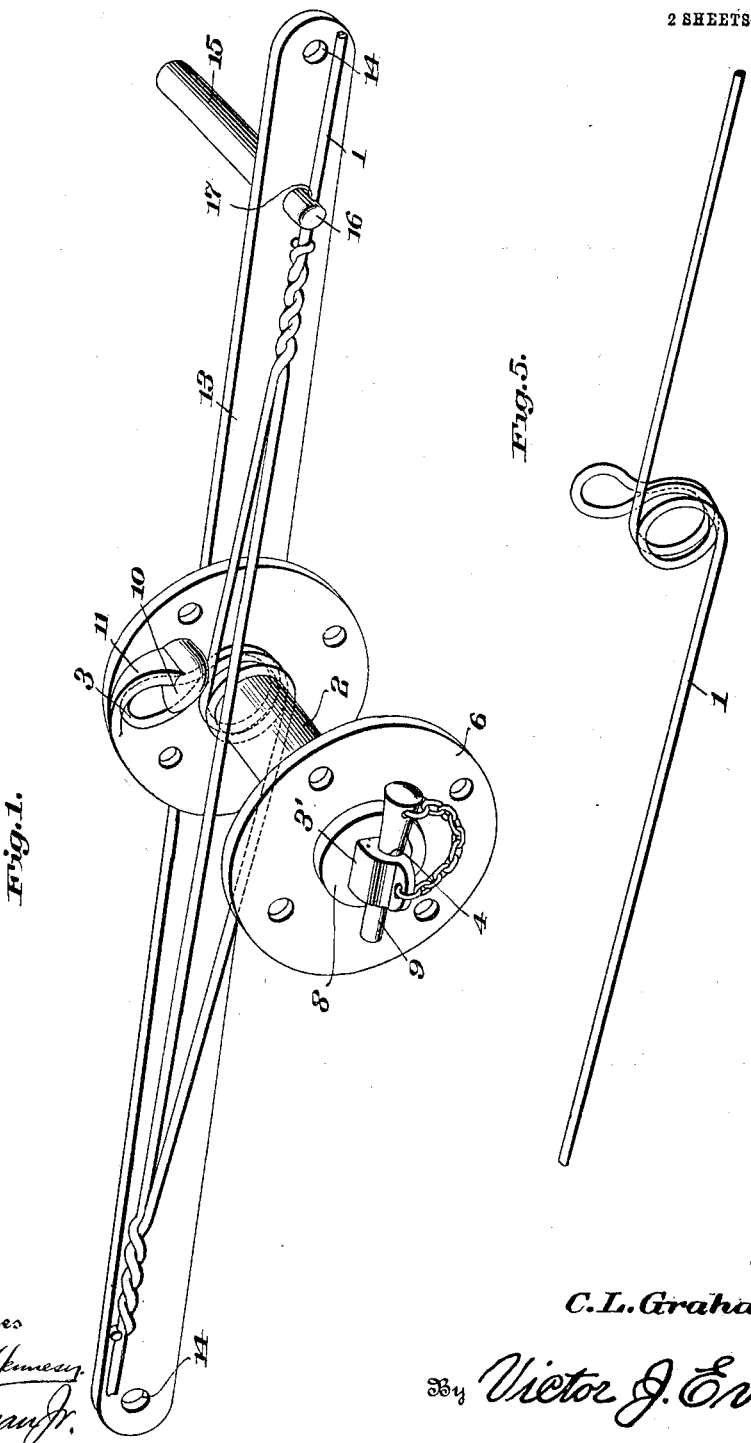

UNITED STATES PATENT OFFICE.

CHARLES LAYTON GRAHAM, OF ASHLEY, NORTH DAKOTA.

WIRE-STRETCHER.

1,113,002.

Specification of Letters Patent.  Patented Oct. 6, 1914.

Application filed September 16, 1913. Serial No. 790,082.

*To all whom it may concern:*

Be it known that I, CHARLES LAYTON GRAHAM, a citizen of the United States, residing at Ashley, in the county of McIntosh and State of North Dakota, have invented new and useful Improvements in Wire-Stretchers, of which the following is a specification.

The present invention relates to improvements in wire tighteners, and is especially adapted for use in taking up slack in wire fence runners.

The primary object of the invention is to provide a simple and efficient midwire fastener which is constructed so as to avoid the necessity of a frame for supporting the spool upon which the wire to be tightened is reeled, and to provide means connected directly to the spool for securing the same against backward rotation during the permanent fastening of the wire.

With the above and other objects in view, the improvement resides in the construction, combination and arrangement of parts set forth in the following specification and falling within the scope of the appended claims.

In the drawings: Figure 1 is a perspective view of a wire tightener constructed in accordance with the present invention, and in operative position upon a fence runner, Fig. 2 is a top plan view of the same and illustrating the handle sustaining the wire against a backward or retrograde movement, Fig. 3 is a sectional view on the line 3—3 of Fig. 2, and Fig. 4 is a sectional view on the line 4—4 of Fig. 2. Fig. 5 is a perspective view of the runner after the same has been coiled to tighten the same with my improvement.

Referring now to the drawings in detail, 1 designates the fence runners, one of which being adapted to be tightened and to this runner is attached my improvement. The improvement embodies a spool 2 which has one of its ends formed with an integral head 3. The opposite end of the spool is provided with a non-circular extension 3′, which is substantially square in cross section, and which is provided with a beveled transverse circular opening 4. The squared end 4 is of less cross sectional diameter than the spool proper, so that a shoulder 5 is provided between the spool and the said portion 3′, and adapted to be arranged upon the said portion 3′ and to have its inner face contact with the shoulder 5 is a removable disk or head 6, the same being formed with a centrally arranged non-circular opening 7. Also arranged upon the non-circular portion 3′ of the spool 5 is a washer 8, which has a non-circular bore and which is adapted to abut with the outer face of the disk 6 to permit of a substantially frusto-conical key 9 passing through the opening 4 of the extension 3′.

Integrally formed upon the inner face of the disk shaped head 3 of the spool 2 is a hook 10, the said hook reducing in size from its base or its portion connected with the head 3 to its point, and the said hook is disposed angularly of the head 3 with relation to the transverse spool 5, and also integrally formed upon the said head 3 and connected with the outer face of the hook 10 is a substantially U-shaped wall or ridge 11.

The outer face of the head 3 is provided with a centrally arranged cross sectional socket 12 for the reception of an operating arm or lever 13. This lever is provided with a plurality of openings 14 which are properly spaced to receive a removable pin or handle 15. The handle 15 has, what may be termed its inner end, formed with a reduced extension 16, the shoulder provided between the said extension and the handle proper serving to limit the movement of the portion 16 through any of the openings 14 of the lever 13. The portion 16 of the handle is rounded in cross section, but is formed with a concavity 17 upon one of its faces, the purpose of which will presently be described. The loose runner 1 is first twisted by a pair of ordinary pliers to provide a loop and the spool 2 is inserted over the loop. The lever 13 is then applied to within the socket 12 and rotated through the medium of the handle 15, the said handle being arranged within the opening 14 best suited for the leverage required thereon. It is, of course, to be understood that the lever 13 is slidably mounted within the socket 12, and upon the rotation of the drum the hook 10 will engage with the end of the loop provided in the runner, and a further rotation of the drum will form additional loops upon the drum until the desired tightness is acquired. To sustain the wire in its tightened position, in order to prevent the uncoiling of the loop formed in the runner, the lever 13 is adjusted longitudinally within the socket 12, and the handle may be removed from the opening with which it engages when the spool is rotated and inserted in another opening which is nearer the head of the spool. The handle 15 is then rotated to bring its concaved portion 16 upon the runner 1 to hold the same against retrograde movement, the hook, it being understood, still engaging with the loop formed upon the runner. When the device is so arranged, a tie wire 18 has its opposite ends twisted in opposite directions upon the runner 1, as clearly shown in the figures of the drawing. The peculiar arrangement of the hook and the rib serves to not only retain the looped end of the coil in engagement with the hook, but also spreads the said loop, so that the same may be readily removed from the spool after the head 6 is removed, and also whereby the said loop and coil may be flattened by an ordinary pincers, if no convenient post is found to attach the loop of the coil. After the tie wire has been fastened to the runner, the handle may be rotated so as to bring its concavity out of engagement with the runner and so permit of the ready removal of the said handle.

It is to be understood that the line wire 1 is drawn longitudinally from opposite directions when the same is coiled as above described, so that the slack is taken up from both ends of the wire. To disengage the loop from the hook 10, it is merely necessary to revolve the head 3 in an opposite direction to that described, and if necessary, manual force may be employed in effecting such disengagement.

Having thus described the invention, what I claim is:

1. In a tightener for wire fences, a spool having a head provided with an inturned hook adapted to receive a loop in the wire runner, a longitudinally adjustable operating lever for the spool, a handle for the lever, said handle having a reduced extension, the said extension having one of its faces concaved, and the said concavity adapted to receive the runner to hold the same against retrograde movement after a portion of the said runner has been looped upon the spool.

2. In a wire tightener, for fence runners, a spool a hook upon one head of the spool adapted to receive a loop in a runner, a longitudinally movable operating lever for the spool, said lever having spaced openings, a handle having a reduced portion passing through one of the openings, and the reduced portion of the said handle having a concave face adapted to serve as a runner-engaging lip.

3. In a wire tightener, for fence runners, a spool having an integral head and a removable head, a hook formed upon the integral head and arranged angularly thereof, a substantially V-shaped ridge increasing in width from the perimeter of the head and connected with the hook, a socket upon the outer face of the head, a longitudinally adjustable lever passing through the socket, said lever having spaced openings, a handle passing through one of the openings, and said handle having an inner concaved face.

In testimony whereof I affix my signature in presence of two witnesses.

CHARLES LAYTON GRAHAM.

Witnesses:
F. N. FULLERTON,
C. A. JOHNSTONE.

---

Copies of this patent may be obtained for five cents each, by addressing the "Commissioner of Patents, Washington, D. C."